United States Patent [19]
Cameron

[11] Patent Number: 5,884,658
[45] Date of Patent: Mar. 23, 1999

[54] LIQUID DISTRIBUTOR FOR A PACKED TOWER

[76] Inventor: Gordon M. Cameron, 4 Wellesbourne Crescent, Willowdale, Ontario, Canada, M2H 1Y7

[21] Appl. No.: 708,750

[22] Filed: Sep. 5, 1996

[51] Int. Cl.⁶ .................................................. B01F 3/04
[52] U.S. Cl. .............................. 137/561 A; 261/98
[58] Field of Search ................... 137/561 A, 561 R; 261/97, 98

[56] References Cited

U.S. PATENT DOCUMENTS

| | | | |
|---|---|---|---|
| 3,158,171 | 11/1964 | Eckert | 261/97 X |
| 3,392,967 | 7/1968 | Eckert | 261/98 |
| 3,419,251 | 12/1968 | Eckert | 261/98 X |
| 3,491,792 | 1/1970 | Eckert | 261/97 X |
| 4,267,978 | 5/1981 | Manteufel | 137/561 A |
| 4,272,026 | 6/1981 | Jazloski et al. | 261/98 X |
| 4,476,069 | 10/1984 | Harper et al. | 261/7 |
| 4,565,216 | 1/1986 | Meier | 137/561 A |
| 4,569,364 | 2/1986 | Keller et al. | 137/561 A X |
| 4,580,597 | 4/1986 | Cordingley et al. | 137/561 A |
| 4,776,989 | 10/1988 | Harper et al. | 261/7 |
| 5,014,740 | 5/1991 | Cameron | 137/561 A |
| 5,072,754 | 12/1991 | Haacker et al. | 137/561 A |
| 5,439,620 | 8/1995 | Maeda | 261/97 |

*Primary Examiner*—John Rivell
*Attorney, Agent, or Firm*—Pillsbury Madison & Sutro, LLP

[57] ABSTRACT

A liquid distributor for use within a cylindrical tower containing tower packing to provide dispersed liquid to the packing comprising (a) a plurality of cordially disposed feed liquid conduits interconnected one to another to form, at least, one coplanar essentially continuous loop, (b) a feed entry for feeding the liquid to the conduits, and (c) sprayers for dispersing the liquid onto the packing. The distributor is of particular value in the sulfric acid manufacturing field as a drying tower, sulfur dioxide stripping tower, sulfur trioxide absorption tower and an oleum tower. The distributor provides improved irrigation across the tower and, particularly, adjacent the tower wall.

11 Claims, 5 Drawing Sheets

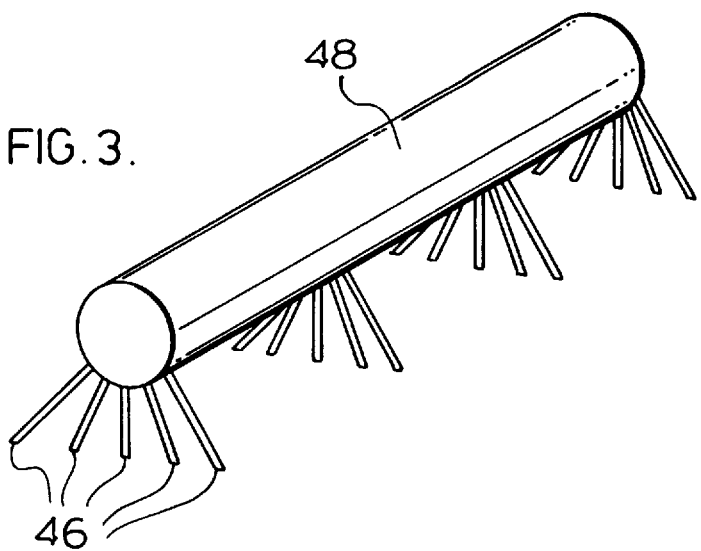
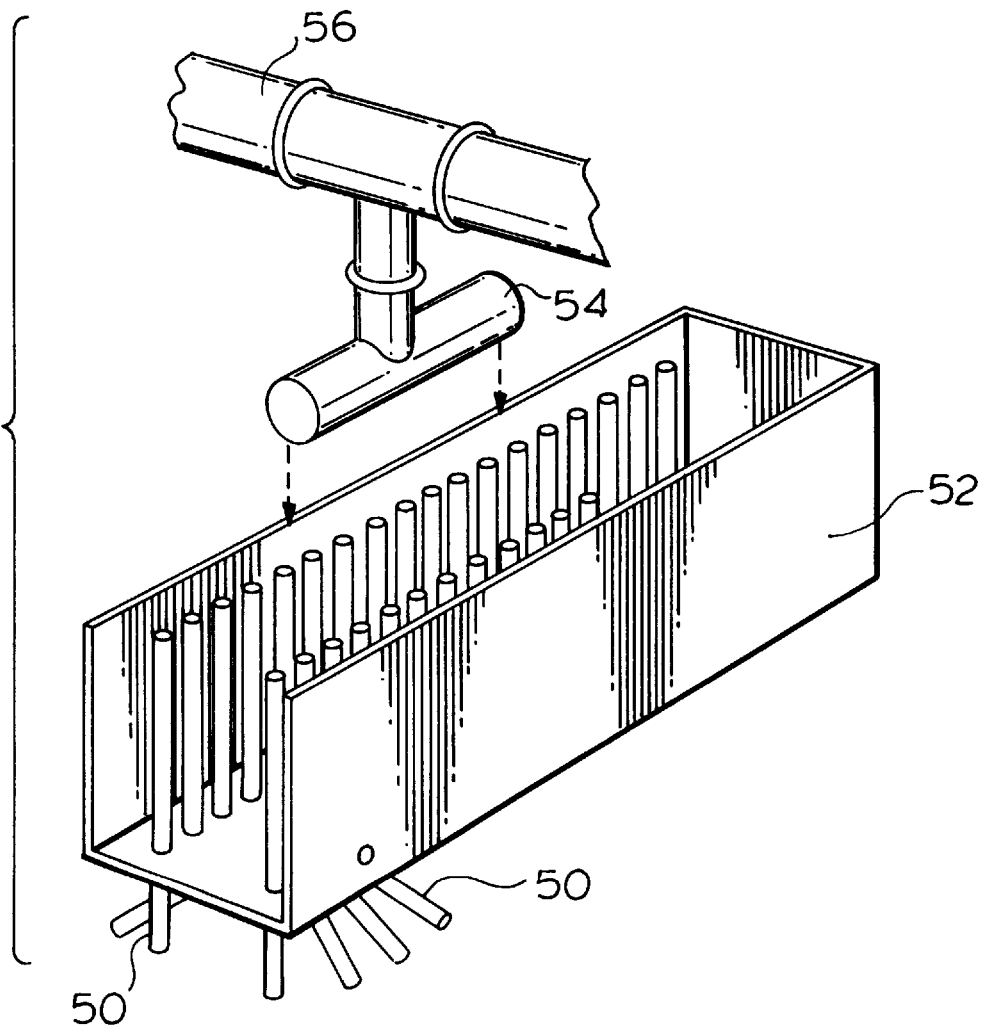

LIQUID DISTRIBUTOR FOR A PACKED TOWER

FIELD OF THE INVENTION

This invention relates to distributors for distributing liquid over a tower containing packing material to provide contact of said liquid with another fluid, and particularly, said distributors for use in distributing sulfuiric acid in an absorption or drying tower.

BACKGROUND TO THE INVENTION

Sulfuric acid plants using the contact process include packed towers for the transfer of water vapour and sulfur trioxide from carrier gases to a sulfiuric acid stream for drying of air or sulfur trioxide absorption, respectively. These towers are, generally, brick-lined and contain ceramic packing. The tower can be as large as ten meters in diameter and contain packing up to four meters deep. Typically, the height of the packing is less than the tower diameter, which can result in problems with both liquid and gas distribution. Liquid flows can be very large and range up to 2500 cubic meters per hour (10,000 U.S. gallons per minute). Gas flows can range as high as 250,000 cubic meters per hour. Tower efficiencies must be very high for the processes to work successfully.

Ceramic packing has been used in packed towers in the contact process for many years. In early plants, such shapes included quartz rocks, pipe sections (Rashig Rings), crushed bricks and special shapes, such as saddles. Most of these shapes had limited gas treatment capacities and the towers were relatively large for the production capacity. Flow restrictions caused by the acid distributors in such towers did not constrain tower capacity. Typical distributors in such towers include pan and trough units, optionally with overflow weirs while others provided downcomers, to carry the acid into the packing. Another variety of distributor contained cast iron pipes with drilled holes servicing as orifices to meter the acid into the packing.

While commercial distributors provide reasonable absorption efficacy, none provide good structural marriages of linear geometry to the circular cross-section of the typical tower. In some cases, many more distribution points have been added to generate a better tower performance, while in the majority of other cases additional packing is used. Distributors which generate more effective liquid distribution, but not necessarily uniform distribution are needed.

Specifically, prior art distributors have feed conduit layouts which generally take the form of a central feed conduit the full diameter of the distributor and extending between the walls across from which a plurality of coplanar chordal cross-member conduits perpendicularly extend. However, the cross-member conduits do not interconnect one to another and terminate adjacent the distributor wall. However, such conduit layouts do not provide fully satisfactory liquid circumferential distribution adjacent and at the distributor wall around the full inner circumference of the wall surface. No provision is made for a network constituted as a full or substantial essentially continuous loop.

Structural areas which need to be addressed are those which provide, namely, (1) distribution from a single feed line into a header system, (2) distribution from the header system to the individual feed points, and (3) distribution from the feed points to the packing.

There is, therefore, a need for a more efficient liquid distribution system, particularly, in absorption and drying towers of use in sulfuric acid manufacture.

SUMMARY OF THE INVENTION

It is an object of the present invention to provide a distributor for spreading liquid across the packing of a tower which distributor offers improved fluid contact.

It is a further object to provide enhanced irrigation in the areas of the tower at and adjacent to the tower wall.

It is a yet further object to provide a distributor of simpler design than prior art distributors and which is more readily adaptable to a wide variety of tower sizes.

It is a further object to provide a distributor which provides a wider range of distribution point densities than prior art distributors.

It is a further object to provide an economical and easily repairable distributor having a long life.

Accordingly, in its broadest respect, the invention provides a distributor for use within a cylindrical tower having a cylindrical wall and operably containing tower packing, said distributor to provide dispersed liquid to said packing and comprising:

i) a plurality of chordally disposed feed liquid chord conduits interconnected one to another to form at least one coplanar essentially continuous loop, ii) feed entry means for feeding said liquid to said conduits; and iii) dispersion means for dispersing said liquid from said conduit onto said packing.

The present invention provides liquid distribution at and adjacent all wall surfaces, including those blind wall areas presently missed by prior art distributors. Such an effect is achieved by provision of a substantially full chordal loop adjacent the wall. Although parts of the chordal conduit may have one or more closed ends to terminate liquid flow fully around the chordal loop, the chordal loop hardware per se is defined, herein, as being essentially continuous since such end portions are so adjacent one to another as to constitute an essentially continuous loop.

Preferably, the chordal loop is constituted as a rectangle, more preferably a square, disposed within the circular wall. Although the chordal conduits may be fed with feed liquid by conduits radially disposed between the wall, most, preferably, the radial conduits are diametrically disposed to connect, perpendicularly, with the chordal conduits. A plurality of perpendicular junctions between a plurality of chords and radical conduits may be formed as to constitute a feed network.

The conduits may be open troughs or feed tubes or pipes as known in the art. Emanating from the conduit array is a plurality of liquid feed points which may be constituted as a plurality of suitably arranged apertures, or downcomers, in each of the conduits, or, in the case of troughs, weirs and associated downcomers. It is highly desirable that the feed points are so located as to provide wetting of the packing adjacent the wall and of the wall surface, as well as across the full area of the packing.

The feed liquid may be fed into the conduit loop or assay at one or more suitable entry points.

BRIEF DESCRIPTION OF THE DRAWINGS

In order that the invention may be better understood, preferred embodiments will now be described by way of example only, with reference to the accompanying drawings, wherein:FIG.

FIGS. 3–5 represent perspective views of liquid dispersion systems of use in distributors according to the prior art and the present invention;

DETAILED DESCRIPTION OF PREFERRED EMBODIMENTS

Figure 1:
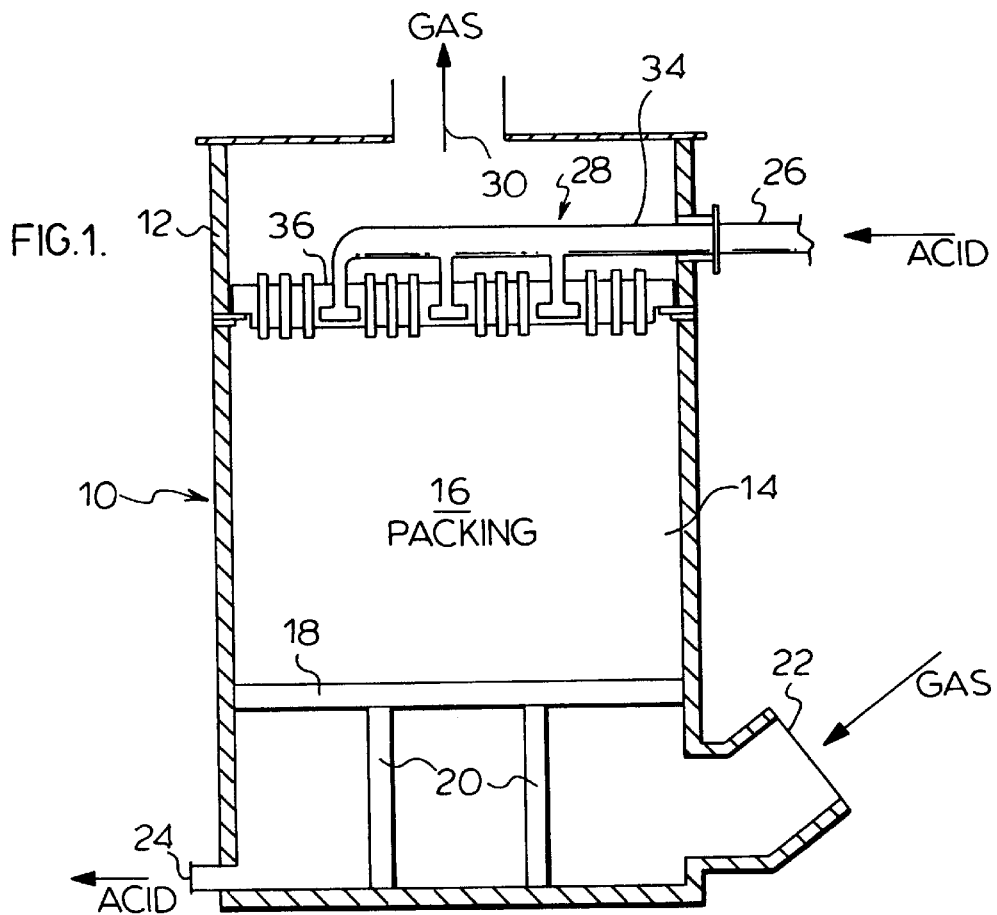
FIG. 1 represents a diagrammatic, vertical section of a typical sulfur trioxide absorption tower according to the prior art.

FIG. 1 shows generally as 10, a cylindrical sulfur trioxide absorption tower having a distributor wall 12, a brick-lined central portion 14, containing ceramic packing 16 on a packing support 18, upheld by support piers 20. At a lower part of tower 10, below support 18 is a sulfur trioxide gas entry port 22 and on enriched sulfuric acid exit port 24. Above packing 16 is a sulfuric acid entry port 26 of distributor system shown generally as 28, and a sulfur trioxide-depleted gas exit port 30.

Figure 2:
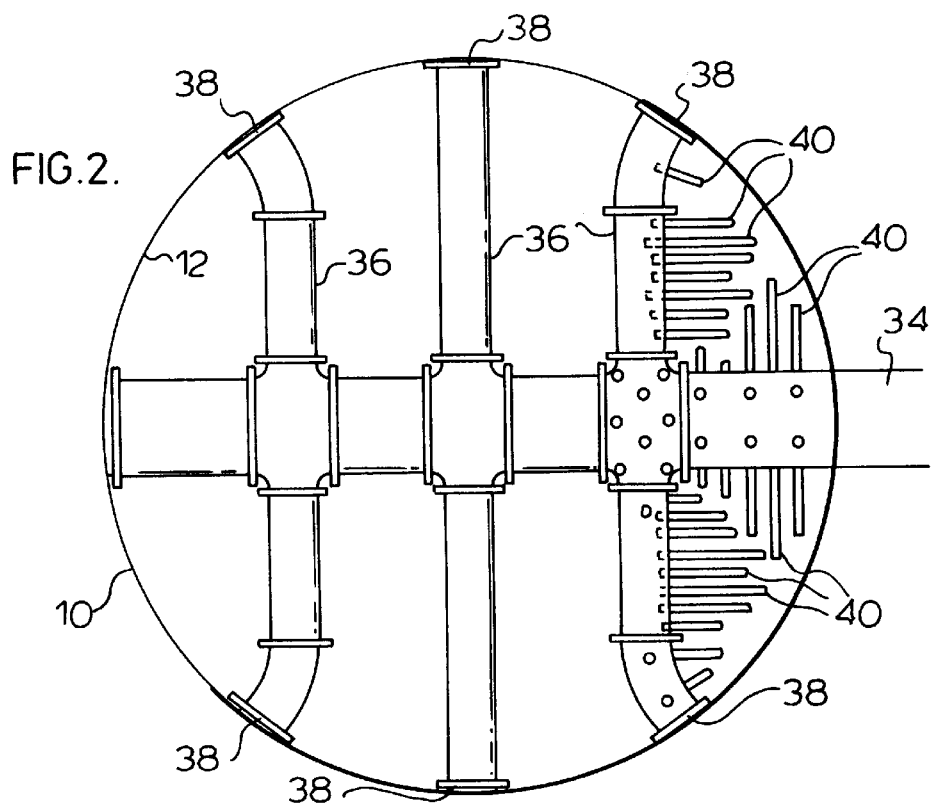
FIG. 2 represents a diagrammatic, horizontal cross-section of a typical sulfur trioxide absorption tower distributor according to the prior art.

With reference also to FIG. 2, tower 10 shows distributor system 28 having a central feed conduit 34 extending diametrically across the tower within wall. 12 and connected with a plurality of coplanar perpendically aligned chordal conduits 36, which terminate adjacent wall 12 at points 38.

Figure 5:
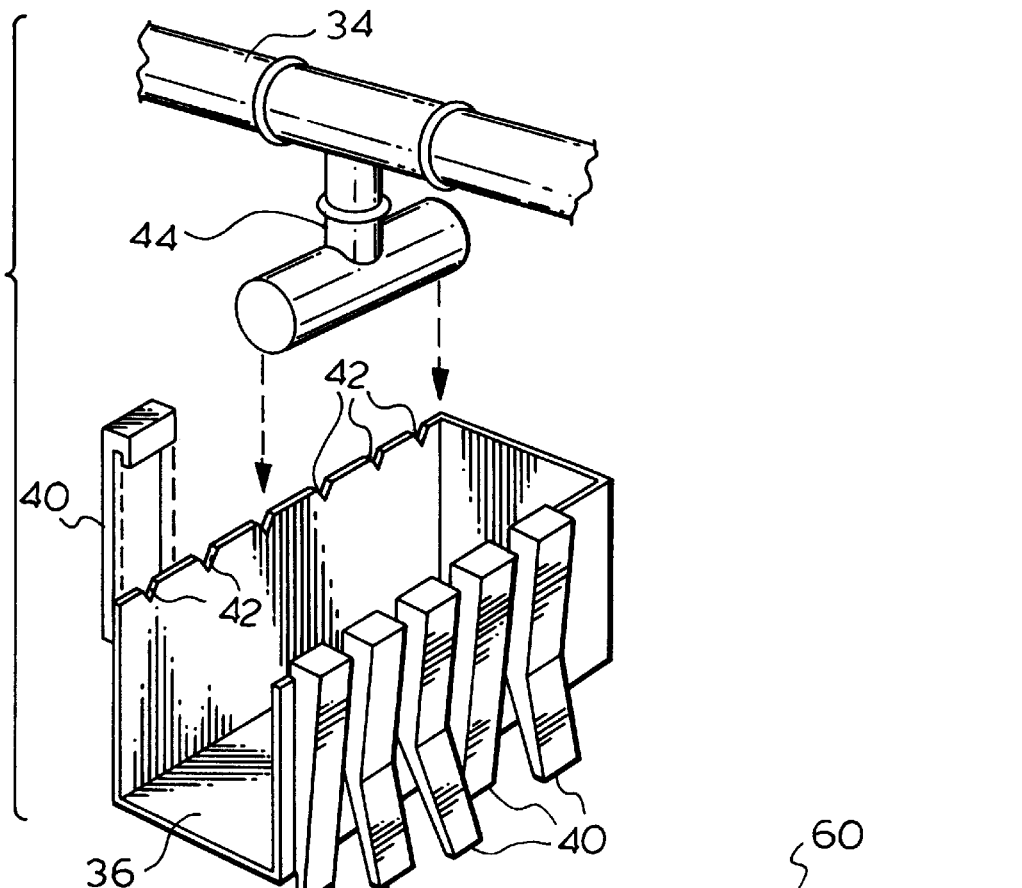

With reference also to FIG. 5, intermittent of the lengths of chordal conduits 36, represented as troughs in FIG. 5, are pluralities of downcomers 40 fitted to weirs 42 formed in troughs 36. Downcomers 40 are off-set one to its adjacent downcomers so as to provide the type of area coverage best seen in FIG. 2.

Troughs 36 are fed with suliric acid from central feed conduit 34 through a plurality of tee-pieces 44, suspended within trough 36.

FIGS. 3 and 4 show alternative sulfuric acid dispersing equipment for dispersing acid onto the tower packing 16, either directly through circumferentially arranged downcomers 46 on each of the tubular chordal conduits 48, as shown in FIG. 3, or through suitably arranged downcomers 50, partially contained within chordal conduit trough 52 as shown in FIG. 4. Acid is fed through a plurality of tee-pieces 54, held within trough 52, from central conduit 56.

Figure 6:
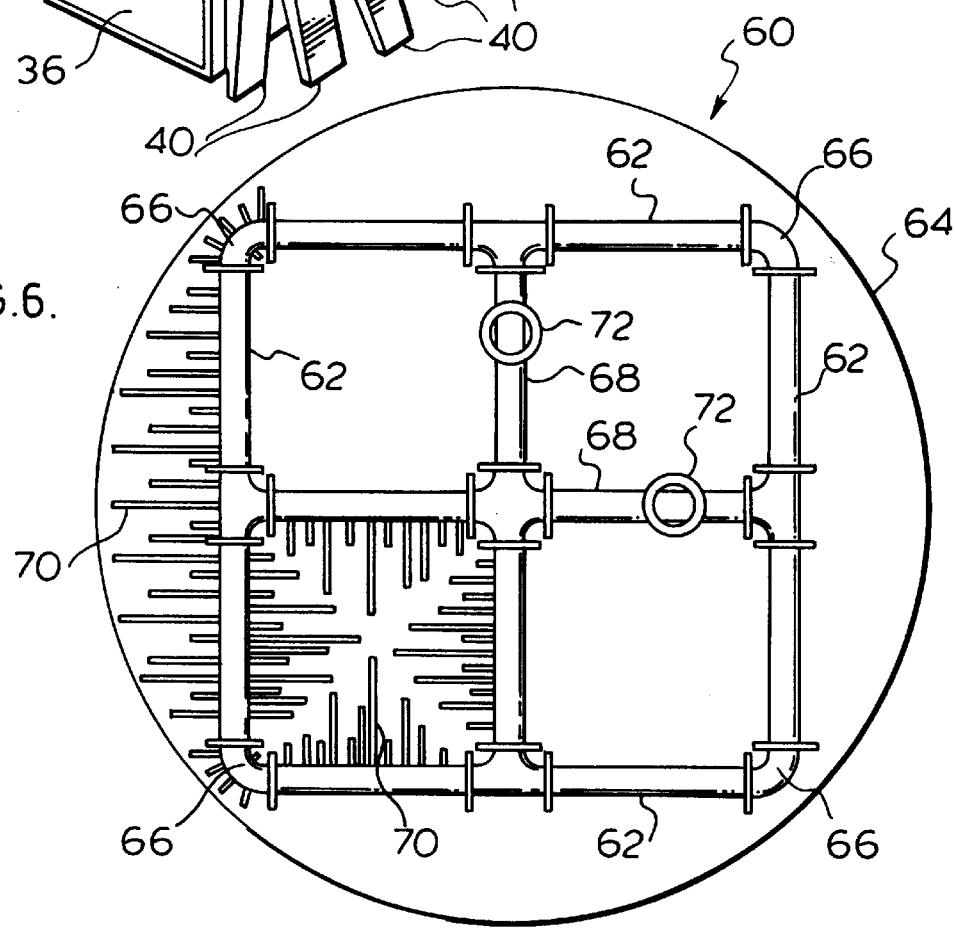
FIG. 6 represents a diagrammatic, horizontal cross-section of a distributor conduit array according to the present invention.
Figure 7:
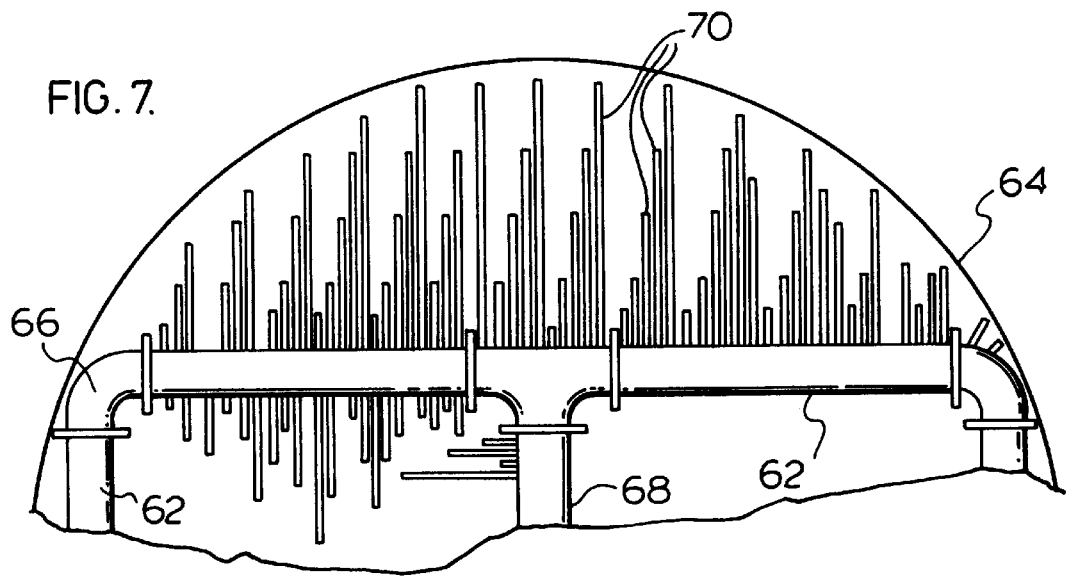
FIGS. 7 and 8 are diagrammatic representatives of the dispersion areas covered by the conduits disposed in an embodiment of a distributor according to the present invention.
Figure 8:
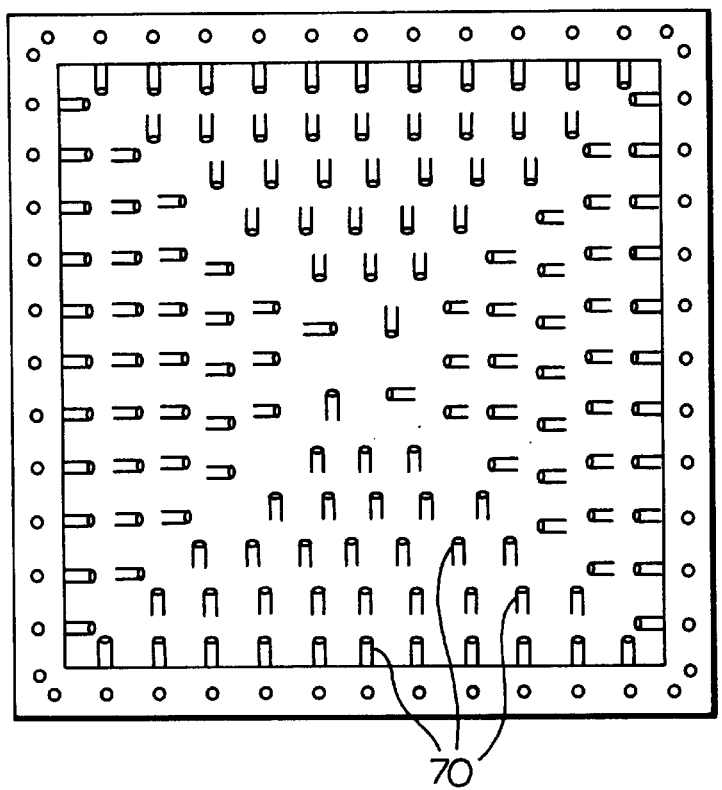

FIG. 6 shows, generally as 60, an inscribed co-planar chordal conduit array, according to the invention, having acid dispersion equipment coverage as shown diagrammatically in FIGS. 7 and 8. Array 60 has a plurality of chordal conduits 62, which define a square inscribed within distributor wall 64. Conduits 62 interconnect, perpendicularly, adjacent wall 64, at their ends 66 to define corners. Midway of the lengths of chord conduits 62 are, perpendicularly, connected diametrically aligned conduits 68. Conduits 62 and 68 define troughs which receive a plurality of downcomers 70, so arranged perpendicularly, as seen in FIG. 5, as to provide suitable acid coverage over the whole of the tower packing area and wall 64.

Downcomers 70 cover the chordal segment, as represented in FIG. 7, and the internal square area, as represented in FIG. 8.

Feed acid enters the conduit array through acid entry ports 72 in conduits 68.

FIGS. 9–12 represent various conduit arrays of alternative embodiments of distributor networks of the invention.

Figure 9:
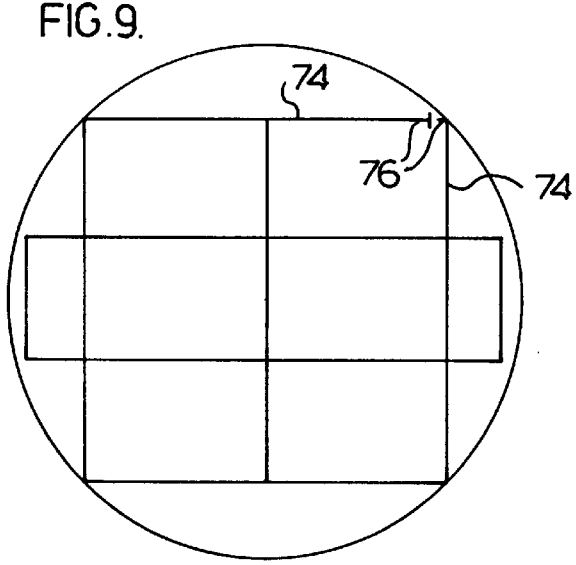
FIGS. 9–12 are diagrammatic representations of various conduit arrays in embodiments according to the invention.
Figure 10:
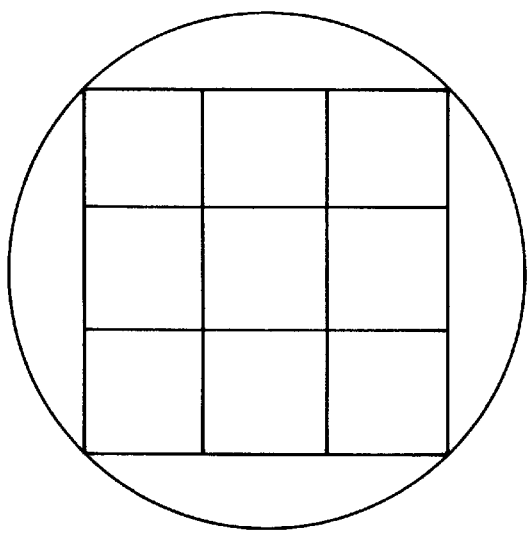

FIG. 9 shows a pair of terminated conduits 74 having closed ends 76 adjacent each other to effectively constitute a physical continuous hardware network although the acid flow between both conduits 70 is not continuous.

Figure 11:
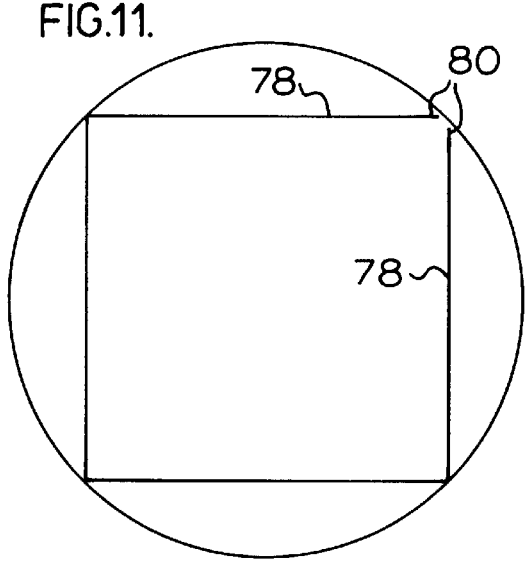

FIG. 11 represents a chordal conduit array 78, defining with wall 78, an inscribed square. Conduits 78 have closed ends 80.

Figure 12:
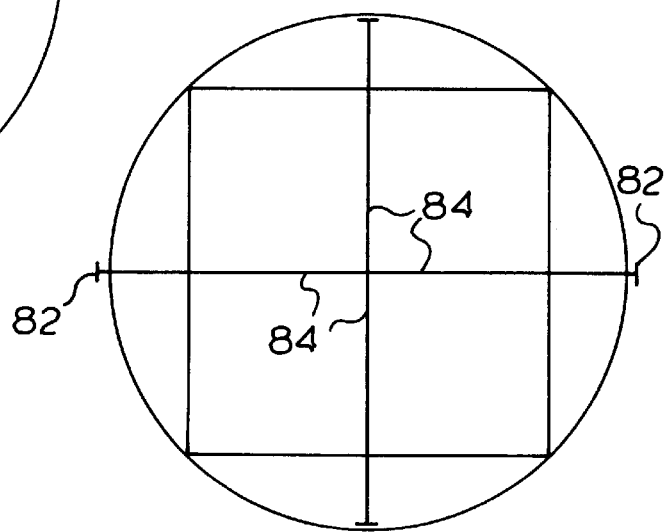

FIG. 12 represents a chordal and diameter conduit network having feed acid entry ports 82 at each end of diameter conduits 84.

The towers of the invention, as hereinbefore described, may be used also, for example, as a drying tower, sulfur dioxide stripping tower and an oleum tower.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

I claim:

1. A distributor for use within a cylindrical tower having a cylindrical wall and operably containing tower packing, said distributor to provide dispersed liquid to said packing and comprising:

i) a plurality of chordally disposed feed liquid chord conduits interconnected one to another to form at least one coplanar essentially continuous loop, ii) feed entry means for feeding said liquid to said conduits; and iii) dispersion means for dispersing said liquid from said conduit onto said packing.

2. A distributor as defined in claim 1 wherein said chord conduits are interconnected substantially perpendicularly one to another.

3. A distributor as defined in claim 2 wherein said chord conduits are interconnected as to define a rectangle.

4. A distributor as defined in any one of claims 1, 2 or 3, further comprising one or more radially disposed feed radial conduits interconnected to said chord conduits.

5. A distributor as defined in claim 4 wherein one or more of said radial conduits is interconnected perpendicularly to said chord conduit.

6. A distributor as defined in claim 1 wherein one or more of said chord conduits comprises a trough.

7. A distributor as defined in claim 1 wherein one or more of said chord conduits comprises a tube.

8. A distributor as defined in claim 4 wherein said feed entry means comprises one or more feed entry apertures within said chord conduits and/or said radial conduits.

9. A distributor as defined in claim 4 wherein said dispersion means comprises one or more of conduit portions defining a plurality of liquid exit apertures selected from (a) a plurality of conduit portions defining apertures within said chord and/or radial conduits; and (b) said apertures of (a) having downcomers.

10. A distributor as defined in claim 1 or claim 2 wherein one or more of said conduits comprises a trough.

11. A distributor as defined in claim 10 wherein said dispersion means comprises said trough having a plurality of weirs and associated downcomers.

* * * * *